US012689032B2

(12) United States Patent
Park et al.

(10) Patent No.: US 12,689,032 B2
(45) Date of Patent: Jul. 21, 2026

(54) NEGATIVE ELECTRODE COMPOSITION, NEGATIVE ELECTRODE FOR LITHIUM SECONDARY BATTERY COMPRISING SAME, LITHIUM SECONDARY BATTERY COMPRISING NEGATIVE ELECTRODE, AND METHOD FOR PREPARING NEGATIVE ELECTRODE COMPOSITION

(71) Applicant: LG ENERGY SOLUTION, LTD., Seoul (KR)

(72) Inventors: Su Jin Park, Daejeon (KR); Jaewook Lee, Daejeon (KR); Sangmin Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 815 days.

(21) Appl. No.: 17/957,506

(22) Filed: Sep. 30, 2022

(65) Prior Publication Data

US 2023/0104135 A1 Apr. 6, 2023

(30) Foreign Application Priority Data

Oct. 5, 2021 (KR) ........................ 10-2021-0131869
Jan. 19, 2022 (KR) ........................ 10-2022-0007659

(51) Int. Cl.
*H01M 4/38* (2006.01)
*H01M 4/04* (2006.01)
*H01M 10/052* (2010.01)
*H01M 50/46* (2021.01)
*H01M 4/02* (2006.01)

(52) U.S. Cl.
CPC ......... *H01M 4/386* (2013.01); *H01M 4/0404* (2013.01); *H01M 10/052* (2013.01); *H01M 50/46* (2021.01); *H01M 2004/021* (2013.01); *H01M 2004/027* (2013.01)

(58) Field of Classification Search
CPC .... H01M 4/386; H01M 4/0404; H01M 50/46; H01M 10/052; H01M 2004/021; H01M 2004/027
See application file for complete search history.

(56) References Cited

U.S. PATENT DOCUMENTS

| 11,322,741 | B2 | 5/2022 | Flatoy et al. |
| 2004/0023113 | A1 | 2/2004 | Suhara et al. |
| 2014/0023928 | A1 | 1/2014 | Jeon et al. |

(Continued)

FOREIGN PATENT DOCUMENTS

| CN | 1431972 | A | 7/2003 |
| EP | 3 694 033 | A1 | 8/2020 |

(Continued)

OTHER PUBLICATIONS

Translation JP2011065934 (Year: 2011).*

(Continued)

*Primary Examiner* — Jane J Rhee
(74) *Attorney, Agent, or Firm* — Birch, Stewart, Kolasch & Birch, LLP

(57) ABSTRACT

Disclosed is a negative electrode composition, a negative electrode for a lithium secondary battery, comprising the same, and a lithium secondary battery comprising the negative electrode, and a method for preparing a negative electrode composition.

15 Claims, 1 Drawing Sheet

(56) References Cited

U.S. PATENT DOCUMENTS

| | | | |
|---|---|---|---|
| 2015/0044570 A1 | 2/2015 | Kim et al. | |
| 2021/0036315 A1 | 2/2021 | Put et al. | |
| 2021/0296640 A1* | 9/2021 | Yoon ..................... | H01M 4/525 |
| 2021/0328225 A1 | 10/2021 | Kim et al. | |

FOREIGN PATENT DOCUMENTS

| | | |
|---|---|---|
| EP | 3 799 163 A1 | 3/2021 |
| JP | 2009-80971 A | 4/2009 |
| JP | 2009-205950 A | 9/2009 |
| JP | 2011-65934 A | 3/2011 |
| JP | 4880016 B2 | 2/2012 |
| JP | 2021-118149 A | 8/2021 |
| KR | 10-2012-0044651 A | 5/2012 |
| KR | 10-2013-0101097 A | 9/2013 |
| KR | 10-2014-0012351 A | 2/2014 |
| KR | 10-2015-0018088 A | 2/2015 |
| KR | 10-2019-0133757 A | 12/2019 |
| KR | 10-2020-0027787 A | 3/2020 |
| KR | 10-2020-0118164 A | 10/2020 |
| KR | 10-2021-0009468 A | 1/2021 |
| KR | 10-2021-0094685 A | 7/2021 |

OTHER PUBLICATIONS

European Search Report for European Application No. 22878836.0, dated Aug. 23, 2024.
International Search Report for International Application No. PCT/KR2022/014845, dated Jan. 17, 2023, with an English translation.
Chinese Office Action and Search Report for Chinese Application No. 202280031910.9, dated Mar. 13, 2026, with English translation of the Office Action.

* cited by examiner

[Figure 1A]
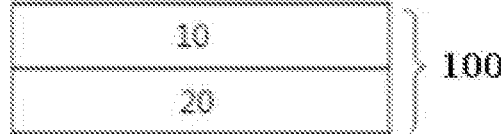
[Figure 1B]
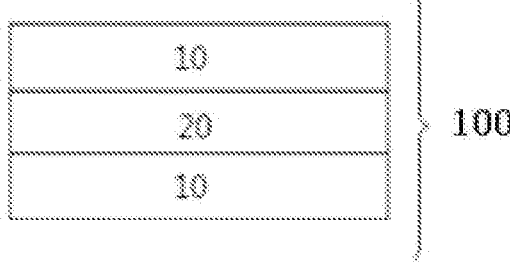
[Figure 2]
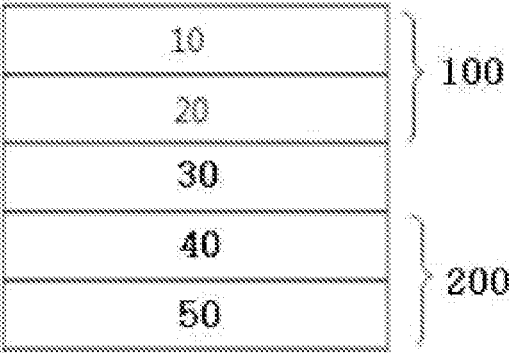

NEGATIVE ELECTRODE COMPOSITION, NEGATIVE ELECTRODE FOR LITHIUM SECONDARY BATTERY COMPRISING SAME, LITHIUM SECONDARY BATTERY COMPRISING NEGATIVE ELECTRODE, AND METHOD FOR PREPARING NEGATIVE ELECTRODE COMPOSITION

CROSS-REFERENCE TO RELATED APPLICATIONS

This application claims priority to and the benefit of Korean Patent Application No. 10-2021-0131869 filed in the Korean Intellectual Property Office on Oct. 5, 2021, and No. 10-2022-0007659 filed in the Korean Intellectual Property Office on Jan. 19, 2022 the entire contents of which are expressly incorporated herein by reference.

TECHNICAL FIELD

The present application relates to a negative electrode composition, a negative electrode for a lithium secondary battery, comprising the same, and a lithium secondary battery comprising the negative electrode, and a method for preparing a negative electrode composition.

BACKGROUND ART

Demands for the use of alternative energy or clean energy are increasing due to the rapid increase in the use of fossil fuels, and as a part of this trend, the most actively studied field is a field of electricity generation and electricity storage using an electrochemical reaction.

Currently, representative examples of an electrochemical device using such electrochemical energy comprise a secondary battery, and the usage areas thereof are increasing more and more.

As technology development of and demand for mobile devices have increased, demands for secondary batteries as an energy source have been rapidly increased. Among such secondary batteries, lithium secondary batteries having high energy density and voltage, long cycle life, and low self-discharge rate have been commercialized and widely used. Further, as an electrode for such a high capacity lithium secondary battery, studies have been actively conducted on a method for preparing a high-density electrode having a higher energy density per unit volume.

In general, a secondary battery includes a positive electrode, a negative electrode, an electrolyte, and a separator. The negative electrode comprises a negative electrode active material for intercalating and de-intercalating lithium ions from the positive electrode, and as the negative electrode active material, a silicon-containing particle having high discharge capacity may be used.

In particular, as the demand for high-density energy batteries has been recently increased, studies have been actively conducted on a method of increasing the capacity using a silicon-containing compound such as Si/C or SiOx, which has a capacity 10-fold or higher than that of a graphite-containing material as a negative electrode active material, but a silicon-containing compound, which is a high-capacity material, has a higher capacity than graphite used in the related art, but has a problem in that the volume rapidly expands in the charging process to disconnect the conductive path, resulting in deterioration in battery characteristics.

Thus, to solve problems when the silicon-containing compound is used as a negative electrode active material, various measures such as a measure of adjusting the driving potential, a measure of suppressing the volume expansion itself such as a method of additionally coating an active material layer with a thin film and a method of controlling the particle size of the silicon-containing compound, or a measure of preventing the conductive path from being disconnected have been discussed.

Nevertheless, a silicon-containing negative electrode still has a characteristic that the movement of ions is disadvantageous because the tortuosity structure is poor due to the characteristics of silicon-containing active material particles. Therefore, there is a need for research on the particle size distribution of a silicon-containing active material itself, which is capable of improving the conductive path.

RELATED ART DOCUMENT

Patent Document (Patent Document 1) Japanese Patent Application Laid-Open No. 2009-080971

SUMMARY OF THE INVENTION

A silicon-containing negative electrode still has the characteristic that the movement of ions is disadvantageous because the tortuosity structure is poor due to the characteristics of silicon-containing active material particles. As a result of conducting studies for improving the conductive path, it was found that fine particles of a silicon-containing active material may prevent the movement of ions, and may also produce a large amount of a solid electrolyte interphase (SEI) layer caused by a side reaction with fine particles in the process of charging and discharging cycle, resulting in rapid aggravation of diffusion resistance.

The present invention has been made in an effort to provide a negative electrode composition capable of solving the above problem, a negative electrode for a lithium secondary battery, comprising the same, and a lithium secondary battery comprising the negative electrode, and a method for preparing a negative electrode composition.

An exemplary embodiment of the present invention provides a negative electrode composition comprising: a silicon-containing active material; a negative electrode conductive material; and a negative electrode binder, in which the silicon-containing active material comprises silicon-containing particles having a particle size distribution of 0.01 μm or more and 30 μm or less, and the silicon-containing active material comprises 1 part by weight or more and 5 parts by weight or less of the silicon particles having a particle size of 1 μm or less based on 100 parts by weight of the silicon-containing active material, and the silicon-containing active material satisfies a particle size ratio of the following Equations 1 and 2:

$$20 \leq (X1/Y) \times 100(\%) \qquad \text{[Equation 1]}$$

$$(X2/Y) \times 100(\%) \leq 230 \qquad \text{[Equation 2]}$$

In Equations 1 and 2,

X1 denotes a D5 particle size of the silicon-containing active material,

X2 denotes a D95 particle size of the silicon-containing active material, and

Y denotes a median particle size (D50) of the silicon-containing active material.

Another exemplary embodiment provides a method for preparing a negative electrode composition, the method comprising: forming a mixture by mixing a negative electrode conductive material; and a negative electrode binder; performing a first mixing by adding water to the mixture; and performing a second mixing by adding a silicon-containing active material to the mixed mixture, in which the silicon-containing active material comprises silicon-containing particles having a particle size distribution of 0.01 μm or more and 30 μm or less and the silicon-containing active material comprises 1 part by weight or more and 5 parts by weight or less of the silicon-containing particles having a particle size of 1 μm or less based on 100 parts by weight of the silicon-containing active material, and the silicon-containing active material satisfies particle size ratios of the following Equations 1 and 2:

$$20 \leq (X1/Y) \times 100 (\%) \qquad \text{[Equation 1]}$$

$$(X2/Y) \times 100 (\%) \leq 230 \qquad \text{[Equation 2]}$$

Still another exemplary embodiment provides a negative electrode for a lithium secondary battery, comprising: a negative electrode current collector layer; and a negative electrode active material layer comprising the negative electrode composition according to the present application formed on one surface or both surfaces of the negative electrode current collector layer.

Yet another exemplary embodiment provides a lithium secondary battery comprising: a positive electrode; the negative electrode for a lithium secondary battery according to the present application; a separator provided between the positive electrode and the negative electrode; and an electrolyte.

In the case of a negative electrode using the existing silicon-containing active material, particularly a negative electrode using pure Si particles has a feature capable of manufacturing a high-capacity and high-density battery, but the higher the purity of Si particles was, the more the problem due to volume expansion occurred, so that the problem was solved by comprising oxides such as SiO. However, this also still has the characteristic that the movement of ions is disadvantageous because the tortuosity structure is poor. In the case of the negative electrode composition according to the present application, the main object of the present invention is to solve the problem by using a silicon-containing active material in which the micronization of silicon-containing particles is controlled and a specific particle size range is satisfied.

The negative electrode composition according to an exemplary embodiment of the present invention is characterized in that in using a silicon-containing active material which is a high-capacity material in order to manufacture a high-capacity battery, characteristics of the silicon-containing active material itself are changed rather than adjusting the characteristics of a conductive material and a binder according to the volume expansion of the silicon-containing active material. Specifically, the silicon-containing active material is characterized in that silicon-containing particles having a particle size distribution of 0.01 μm or more and 30 μm or less are included, and the silicon-containing particles having a particle size of 1 μm or less are included in an amount of 1 part by weight or more and 5 parts by weight or less based on 100 parts by weight of the silicon-containing active material, and the particle size distribution of the silicon-containing active material is adjusted to the ranges of Equations 1 and 2.

That is, the negative electrode composition according to the present application may have an advantage in that as fine particles are removed in terms of tortuosity in the electrode by comprising a silicon-containing active material whose particle size distribution is controlled as described above, the movement (conductive path) of lithium ions during charging and discharging is advantageous. Further, fine silicon particles that may hinder lithium ions from moving during charging and discharging induce an increase in diffusion resistance by reacting with lithium ions to cause a side reaction, but the rate at which the diffusion resistance increases may be greatly controlled by comprising the silicon-containing active material whose particle size distribution is controlled to the ranges of Equations 1 and 2 according to the present application even though the cycle of the charging and discharging process is continued.

That is, compared to the case where an existing silicon-containing active material is used, a lithium secondary battery, in which the silicon-containing active material adjusted to predetermined particle size ranges (ranges of Equations 1 and 2) is used as in the present invention, may solve the problems of a reduction in service life and an increase in resistance during charging and discharging.

BRIEF DESCRIPTION OF THE DRAWINGS

FIG. 1A is a view illustrating the stacking structure of a negative electrode for a lithium secondary battery according to an exemplary embodiment of the present application.

FIG. 1B is a diagram illustrating the stacking structure of a negative electrode for a lithium secondary battery anode according to another embodiment of the present application.

FIG. 2 is a view illustrating the stacking structure of a lithium secondary battery according to an exemplary embodiment of the present application.

DETAILED DESCRIPTION

Prior to the description of the present invention, some terms will be first defined.

When one part "includes" one constituent element in the present specification, unless otherwise specifically described, this does not mean that another constituent element is excluded, but means that another constituent element may be further included.

In the present specification, 'p to q' means a range of 'p or more and q or less'.

In the present specification, "specific surface area" is measured by the BET method, and is specifically calculated from an amount of nitrogen gas adsorbed under liquid nitrogen temperature (77K) using BELSORP-mini II manufactured by BEL Japan, Inc. That is, in the present application, the BET specific surface area may mean a specific surface area measured by the measurement method.

In the present specification, "Dn" means the particle size distribution, and means the particle size at the n % point of the cumulative distribution of the number of particles according to the particle size. That is, D50 is the particle size (median particle size) at the 50% point of the cumulative distribution of the number of particles according to the particle size, D90 is the particle size at the 90% point of the cumulative distribution of the number of particles according to the particle size, and D10 is the particle size at the 10% point of the cumulative distribution of the number of particles according to the particle size. Further, D95 is the particle size at the 95% point of the cumulative distribution of the number of particles according to the particle size, and D5 is the particle size at the 5% point of the cumulative distribution of the number of particles according to the particle size. Meanwhile, the median particle size may be measured using a laser diffraction method. Specifically, after a powder to be measured is dispersed in a dispersion medium, a particle size distribution is calculated by introducing the resulting dispersion into a commercially available laser diffraction particle size measurement device (for example, Microtrac S3500) to measure the difference in diffraction pattern according to the particle size when particles pass through the laser beam.

In an exemplary embodiment of the present application, the particle size or particle diameter may mean the average diameter or representative diameter of each grain forming a powder.

In the present specification, the fact that a polymer comprises a monomer as a monomer unit means that the monomer participates in a polymerization reaction, and thus is included as a repeating unit in the polymer. In the present specification, when the polymer comprises a monomer, it is interpreted to be the same as when the polymer comprises a monomer as a monomer unit.

In the present specification, the 'polymer' is understood to be used in a broad sense, comprising a copolymer, unless otherwise specified as a 'homopolymer'.

In the present specification, a weight average molecular weight (Mw) and a number average molecular weight (Mn) are polystyrene-conversion molecular weights measured by gel permeation chromatography (GPC) using a monodisperse polystyrene polymer (standard sample) with various degrees of polymerization commercially available for the measurement of the molecular weight as a standard material. In the present specification, the molecular weight means a weight average molecular weight unless otherwise described.

Hereinafter, the present invention will be described in detail with reference to drawings, such that a person with ordinary skill in the art to which the present invention pertains can easily carry out the present invention. However, the present invention can be implemented in various different forms, and is not limited to the following description.

An exemplary embodiment of the present specification provides a negative electrode composition comprising: a silicon-containing active material; a negative electrode conductive material; and a negative electrode binder, in which the silicon-containing active material comprises silicon-containing particles having a particle size distribution of 0.01 μm or more and 30 μm or less, and comprises 1 part by weight or more and 5 parts by weight or less of the silicon particles having a particle size of 1 μm or less based on 100 parts by weight of the silicon-containing active material, and the silicon-containing active material satisfies the particle size ratio of Equations 1 and 2.

The negative electrode composition according to an exemplary embodiment of the present invention is characterized in that in using a silicon-containing active material which is a high-capacity material in order to manufacture a high-capacity battery, characteristics of the silicon-containing active material itself are changed rather than adjusting the characteristics of a conductive material and a binder according to the volume expansion of the silicon-containing active material. Specifically, the present invention is characterized in that silicon-containing particles having a particle size distribution of 0.01 μm or more and 30 μm or less are included, the silicon-containing particles having a particle size of 1 μm or less are included in an amount of 1 part by weight or more and 5 parts by weight or less based on 100 parts by weight of the silicon-containing active material, and the particle size distribution of the silicon-containing active material is adjusted to the ranges of Equations 1 and 2.

In an exemplary embodiment of the present application, in a negative electrode composition comprising: a silicon-containing active material; a negative electrode conductive material; and a negative electrode binder, the silicon-containing active material comprises silicon-containing particles having a particle size distribution of 0.01 μm or more and 30 μm or less, and comprises 1 part by weight or more and 5 parts by weight or less of the silicon-containing particles having a particle size of 1 μm or less based on 100 parts by weight of the silicon-containing active material, the D5/D50 ratio of the silicon-containing active material is 20% or more, and the D95/D50 ratio of the silicon-containing active material may be 230% or less.

In an exemplary embodiment of the present application, the Dx/Dy ratio of the silicon-containing active material may be calculated by a general calculation method of the ratio, and a calculation formula may be expressed as (Dx/Dy)×100(%). That is, as an example, the D95/D50 ratio of the silicon-containing active material may be calculated as (D95/D50)×100.

In an exemplary embodiment of the present application, provided is a negative electrode composition in which the silicon-containing particle comprises one or more selected from the group consisting of SiOx (x=0), SiOx (0<x<2), SiC, and a Si alloy.

In an exemplary embodiment of the present application, provided is a negative electrode composition in which the silicon-containing particle comprises one or more selected from the group consisting of SiOx (x=0) and SiOx (0<x<2), and comprises 70 parts by weight or more of the SiOx (x=0) based on 100 parts by weight of the silicon-containing active material.

In an exemplary embodiment of the present application, provided is a negative electrode composition in which the silicon-containing particle comprises SiOx (x=0), and comprises 70 parts by weight or more of the SiOx (x=0) based on 100 parts by weight of the silicon-containing active material.

In another exemplary embodiment, the SiOx (x=0) may be included in an amount of 70 parts by weight or more, preferably 80 parts by weight or more, and more preferably 90 parts by weight or more, and may be included in an amount of 100 parts by weight or less, preferably 99 parts by weight or less, and more preferably 95 parts by weight or less, based on 100 parts by weight of the silicon-containing active material.

In an exemplary embodiment of the present application, the silicon-containing active material comprising particularly pure silicon (Si) particles may be used as the silicon-containing active material. The use of pure silicon (Si) particles as the silicon-containing active material may mean that based on the total 100 parts by weight of the silicon-containing active material as described above, pure Si particles (SiOx (x=0)), which are not bound to other particles or elements, are included in the above range.

In an exemplary embodiment of the present application, the silicon-containing active material may be composed of silicon-containing particles having 100 parts by weight of SiOx (x=0) based on 100 parts by weight of the silicon-containing active material.

In an exemplary embodiment of the present application, the silicon-containing active material may comprise metal impurities, and in this case, the impurities are metals which may be generally included in the silicon-containing active material, and may be specifically included in an amount of 0.1 part by weight or less based on 100 parts by weight of the silicon-containing active material.

Since the silicon-containing active material has a remarkably high capacity compared to a graphite-containing active material used in the related art, attempts to apply the silicon-containing active material are increasing, but the attempt is limited to a case where a small amount of the silicon-containing active material is mixed with the graphite-containing active material and used, and the like because the silicon-containing active material has a high volume expansion rate in the charging and discharging process.

Therefore, the present invention has solved the existing problems by adjusting the particle size distribution of the silicon-containing active material itself rather than adjusting the compositions of the conductive material and the binder in order to solve problems such as the electrode tortuosity and the increase in diffusion resistance caused by the charging and discharging cycle while using only the silicon-containing active material as a negative electrode active material in order to improve the capacity performance.

In an exemplary embodiment of the present application, the silicon-containing active material may comprise silicon-containing particles having a particle size distribution of 0.01 μm or more and 30 μm or less.

The fact that the silicon-containing active material comprises silicon-containing particles having a particle size distribution of 0.01 μm or more and 30 μm or less means that a large number of individual silicon-containing particles having a particle size within the above range are included, and the number of silicon-containing particles to be included is not limited.

When the silicon-containing particles have a spherical shape, the particle size of the silicon-containing particles may be expressed as the diameter of the silicon-containing particle, but even in the case of other non-spherical shapes, the particle size may be measured compared to the case of the spherical shape, and in general, the particle size of individual silicon-containing particles may be measured by a method measured in the art.

In an exemplary embodiment of the present application, the silicon-containing particles having a particle size of 1 μm or less may be included in an amount of 1 part by weight or more and 5 parts by weight or less based on 100 parts by weight of the silicon-containing active material.

In another exemplary embodiment, the silicon-containing particles having a particle size of 1 μm or less may be included in an amount of 1 part by weight or more and 5 parts by weight or less, preferably 1 part by weight or more and 4 parts by weight or less, and 1.2 parts by weight or more and 4 parts by weight or less, based on 100 parts by weight of the silicon-containing active material.

That is, the silicon-containing active material according to the present invention has silicon-containing particles having a particle size distribution of 0.01 μm or more and 30 μm or less and simultaneously has silicon-containing particles having a particle size of 1 μm or less in the above range, and may be expressed as a silicon-containing active material in which the micronization of silicon-containing particles is controlled.

As the silicon-containing active material according to the present invention satisfies the above weight range, fine silicon-containing particles may be removed to form a structure which is advantageous in terms of tortuosity in the electrode, thereby preventing the diffusion resistance from increasing, and the rate at which the diffusion resistance increases may also be greatly controlled even though the cycle of the charging and discharging process is continued. This is the result of controlling a silicon-containing active material with a small particle size, which causes a side reaction with lithium ions, and has a feature of increasing the service life and capacity of electrodes comprising the silicon-containing active material.

In an exemplary embodiment of the present application, provided is a negative electrode composition in which the D5/D50 ratio of the silicon-containing active material is 20% or more and the D95/D50 ratio of the silicon-containing active material is 230% or less.

The above-described equations may be applied to the D5/D50 ratio and the D95/D50 ratio, and specifically, the equations may be applied as $(D5/D50)\times100(\%)$ and $(D95/D50)\times100(\%)$.

In an exemplary embodiment of the present application, the D5/D50 ratio of the silicon-containing active material may be expressed as Equation 1.

In an exemplary embodiment of the present application, Equation 1 may satisfy $20\leq(X1/Y)\times100(\%)$.

In another exemplary embodiment, Equation 1 may be $20\leq(X1/Y)\times100(\%)$, preferably $25\leq(X1/Y)\times100(\%)$, and more preferably $30\leq(X1/Y)\times100(\%)$, and may satisfy a range of $(X1/Y)\times100(\%)\leq80$, preferably $(X1/Y)\times100(\%)\leq70$, and more preferably $(X1/Y)\times100(\%)\leq55$.

In an exemplary embodiment of the present application, the D5/D50 ratio of the silicon-containing active material may be 20% or more, preferably 25% or more, and more preferably 30% or more, and may satisfy a range of 80% or less, preferably 70% or less, and more preferably 55% or less.

In an exemplary embodiment of the present application, the D95/D50 ratio of the silicon-containing active material may be expressed as Equation 2.

In an exemplary embodiment of the present application, Equation 2 may satisfy $(X2/Y)\times100(\%)\leq230$.

In an exemplary embodiment of the present application, the D95/D50 ratio of the silicon-containing active material may satisfy a range of 230% or less, preferably 220% or less, and most preferably 210% or less, and may satisfy a range of 180% or more, preferably 190% or more.

In an exemplary embodiment of the present application, Equation 2 may satisfy $(X2/Y)\times100(\%)\leq230$, preferably $(X2/Y)\times100(\%)\leq220$, and more preferably $(X2/Y)\times100(\%)\leq210$, and may satisfy a range of $180\leq(X2/Y)\times100(\%)$, preferably $190\leq(X2/Y)\times100(\%)$.

As the D5/D50 ratio (Equation 1) and D95/D50 ratio (Equation 2) of the silicon-containing active material according to the present application are adjusted to the above ranges, the present invention has a feature in which it is possible to form a structure which is advantageous in terms of tortuosity in the electrode, and also to control the rate at which the diffusion resistance increases as the charging and discharging cycle is continued.

In an exemplary embodiment of the present application, Y denotes the median particle size (D50) of the silicon-containing active material. Specifically, Y may satisfy a range of 3 μm or more and 10 μm or less, and preferably 4 μm or more and 7 μm or less, and more preferably 4.5 μm or more and 7 μm or less.

In an exemplary embodiment of the present application, X1 denotes the D5 particle size of the silicon-containing active material. Specifically, X1 may satisfy a range of 2 μm or more and 5 μm or less, preferably 2.3 μm or more and 4 μm or less, and more preferably 2.5 μm or more and 4 μm or less.

In an exemplary embodiment of the present application, X2 denotes the D95 particle size of the silicon-containing active material. Specifically, X2 may satisfy a range of 6 μm or more and 15 μm or less, preferably 7 μm or more and 14 μm or less, and more preferably 8 μm or more and 14 μm or less.

In an exemplary embodiment of the present application, provided is a negative electrode composition in which the D5/D95 ratio of the silicon-containing active material is 20% or more.

The above-described equation may be applied to the D5/D95 ratio, and specifically, the equation may be applied as (D5/D95)×100(%).

That is, in an exemplary embodiment of the present application, provided is a negative electrode composition in which the silicon-containing active material satisfies a particle size ratio of the following Equation 3:

$$10 \leq (X1/X2) \times 100(\%) \qquad \text{[Equation 3]}$$

In Equation 3,

X1 denotes the D5 particle size of the silicon-containing active material, and

X2 denotes the D95 particle size of the silicon-containing active material.

In another exemplary embodiment, Equation 3 may satisfy a range of $10 \leq (X1/X2) \times 100(\%)$, preferably $15 \leq (X1/X2) \times 100(\%)$, and more preferably $20 \leq (X1/X2) \times 100(\%)$, and may satisfy a range of $(X1/X2) \times 100(\%) \leq 70$, preferably $(X1/X2) \times 100(\%) \leq 60$, and more preferably $(X1/X2) \times 100(\%) \leq 55$.

In an exemplary embodiment of the present application, provided is a negative electrode composition in which the silicon-containing particles having a particle size distribution of 0.01 μm or more and 30 μm or less have a full width at half maximum of 1 μm or more and 5 μm or less.

The fact that the D5/D95 ratio (Equation 3) and the ratio of the full width at half maximum are satisfied means that the particle size distribution is sharply formed in a Particle-Size Distribution (PSD)graph, and as the above ranges are satisfied, the present invention has a feature capable of solving the problem of an increase in resistance by suppressing a side reaction caused by the charging and discharging even though the silicon-containing active material of pure Si is applied. The particle-size distribution (PSD) is a list of values or a mathematical function that defines the relative amount of particles present according to size. It can offer the information regarding the particle size span width, and D10, D50, and D90 (as known as D-value or threepoint specification) are the most widely used values in PSD analysis. Those values indicate the particle diameter at 10%, 50%, and 90% the cumulative distribution. For example, supposing that D50 is 100 nm, it means 50% of the particles in the sample are larger than 100 nm, and 50% smaller than 100 nm. Additional parameters regarding size distribution can be calculated by D10, D50, and D90. For example, span—an indication of the width of the distribution—can be calculated as follow:

$$\text{Span} = (D90 - D10)/D50.$$

In an exemplary embodiment of the present application, a Dmax of the silicon-containing active material may satisfy a range of 30 μm or less. Specifically, the Dmax may satisfy a range of 30 μm or less, and 27 μm or less, and may satisfy 10 μm or more.

In an exemplary embodiment of the present application, a Dmin of the silicon-containing active material may satisfy a range of 0.5 μm or more. Specifically, the Dmin may satisfy a range of 0.5 μm or more, and 1 μm or more, and may satisfy 5 μm or less.

The Dmax and Dmin may mean the particle size of the silicon-containing particles having the largest particle size (Dmax) and the particle size of the silicon-containing particles having the smallest particle size (Dmin) among the silicon-containing active materials comprising silicon-containing particles.

In an exemplary embodiment of the present application, the silicon-containing active material generally has a characteristic BET surface area. The BET surface area of the silicon-containing active material is preferably 0.01 $m^2$/g to 150.0 $m^2$/g, more preferably 0.1 $m^2$/g to 100.0 $m^2$/g, particularly preferably 0.2 $m^2$/g to 80.0 $m^2$/g, and most preferably 0.2 $m^2$/g to 18.0 $m^2$/g. The BET surface area is measured by DIN 66131 (using nitrogen).

In an exemplary embodiment of the present application, the silicon-containing active material may be present, for example, in a crystalline or amorphous form, and preferably is not porous. The silicon particles are preferably spherical or fragment-shaped particles. Alternatively, but less preferably, the silicon particles may also have a fibrous structure or be present in the form of a film or coating comprising silicon.

In an exemplary embodiment of the present application, provided is a negative electrode composition in which the silicon-containing active material is present in an amount of 60 parts by weight or more based on 100 parts by weight of the negative electrode composition.

In another exemplary embodiment, the silicon-containing active material may be present in an amount of 60 parts by weight or more, preferably 65 parts by weight or more, and more preferably 70 parts by weight or more, and may be present in an amount of 95 parts by weight or less, preferably 90 parts by weight or less, and more preferably 80 parts by weight or less, based on 100 parts by weight of the negative electrode composition.

The negative electrode composition according to the present application has a feature capable of solving the problem of an increase in resistance and the problem of reduction in service life by adjusting the particle size of the silicon-containing active material itself, when a silicon-containing active material having a remarkably high capacity is used in the above range.

In an exemplary embodiment of the present application, the silicon-containing active material may have a non-circular form, and the circularity thereof is, for example, 0.9 or less, for example 0.7 to 0.9, for example, 0.8 to 0.9, and for example, 0.85 to 0.9.

In the present application, the circularity is determined by the following Equation A-1, where A is the area and P is the boundary line.

$$4\pi A/P^2 \qquad \text{[Equation A-1]}$$

In the related art, it was common to use only a graphite-containing compound as a negative electrode active material, but recently, as the demand for a high-capacity battery has increased, attempts to mix and use a silicon-containing active material have been increased in order to increase the capacity. However, in the case of the silicon-containing active material, even though characteristics of the silicon-containing active material itself are adjusted as described above, the volume rapidly expands in the process of charging and discharging, so that a problem in that a conductive path formed in the negative electrode active material layer is impaired may occur in some cases.

Therefore, in an exemplary embodiment of the present application, the negative electrode conductive material may comprise one or more selected from the group consisting of a dotted conductive material, a planar conductive material, and a linear conductive material.

In an exemplary embodiment of the present application, the dotted conductive material may be used to enhance the conductivity of the negative electrode, and means a conductive material having conductivity in a spherical or dot form without inducing a chemical change. Specifically, the dotted conductive material may be at least one selected from the group consisting of natural graphite, artificial graphite, carbon black, acetylene black, Ketjen black, channel black, furnace black, lamp black, thermal black, a conductive fiber, fluorocarbon, an aluminum powder, a nickel powder, zinc oxide, potassium titanate, titanium oxide and a polyphenylene derivative, and may preferably comprise carbon black in terms of implementing high conductivity and being excellent in dispersibility.

In an exemplary embodiment of the present application, the dotted conductive material may have a BET specific surface area of 40 $m^2/g$ or more and 70 $m^2/g$ or less, preferably 45 $m^2/g$ or more and 65 $m^2/g$ or less, and more preferably 50 $m^2/g$ or more and 60 $m^2/g$ or less.

In an exemplary embodiment of the present application, the dotted conductive material may satisfy a functional group content (volatile matter) of 0.01% or more and 1% or less, preferably 0.01% or more and 0.3% or less, and more preferably 0.01% or more and 0.1% or less.

In particular, when the functional group content of the dotted conductive material satisfies the above range, a functional group present on the surface of the dotted conductive material is present, so that when water is used as a solvent, the dotted conductive material may be smoothly dispersed in the solvent.

In an exemplary embodiment of the present application, it is characterized in that the dotted conductive material having a functional group content in the above range is comprised along with the silicon-containing active material, and the functional group content may be adjusted according to the degree to which the dotted conductive material is heat-treated.

That is, in the manufacture of the dotted conductive material, a high functional group content means that a large amount of foreign materials are present, and a low functional group content may mean that a heat treatment processing has been conducted more frequently.

In an exemplary embodiment of the present application, the dotted conductive material may have a particle diameter of 10 nm to 100 nm, preferably 20 nm to 90 nm, and more preferably 20 nm to 60 nm.

In an exemplary embodiment of the present application, the conductive material may comprise a planar conductive material.

The planar conductive material may increase the surface contact between silicon particles in the negative electrode to improve conductivity and simultaneously suppress the disconnection of the conductive path due to the volume expansion, and may be expressed as a plate-like conductive material or bulk conductive material.

In an exemplary embodiment of the present application, the planar conductive material may comprise at least one selected from the group consisting of plate-like graphite, graphene, graphene oxide, and graphite flake, and may be preferably plate-like graphite.

In an exemplary embodiment of the present application, the planar conductive material may have an average particle diameter (D50) of 2 μm to 7 μm, specifically 3 μm to 6 μm, and more specifically 4 μm to 5 μm. When the average particle diameter satisfied the above range, sufficient particle size facilitates dispersion without causing an excessive increase in viscosity of the negative electrode slurry. Therefore, the dispersion effect is excellent when particles are dispersed using the same equipment and time.

In an exemplary embodiment of the present application, the planar conductive material provides a negative electrode composition having a D10 of 0.5 μm or more and 1.5 μm or less, a D50 of 2.5 μm or more and 3.5 μm or less, and a D90 of 7.0 μm or more and 15.0 μm or less.

In an exemplary embodiment of the present application, as the planar conductive material, it is possible to use a high specific surface area planar conductive material having a high BET specific surface area; or a low specific surface area planar conductive material.

In an exemplary embodiment of the present application, as the planar conductive material, a high specific surface area planar conductive material; or a low specific surface area planar conductive material may be used without limitation, but in particular, the planar conductive material according to the present application may be affected by the dispersion effect to some extent in the electrode performance, so that it may be particularly desirable to use a low specific surface area planar conductive material that does not cause a problem in dispersion.

In an exemplary embodiment of the present application, the planar conductive material may have a BET specific surface area of 5 $m^2/g$ or more.

In another exemplary embodiment, the planar conductive material may have a BET specific surface area of 5 $m^2/g$ or more and 500 $m^2/g$ or less, preferably 5 $m^2/g$ or more and 300 $m^2/g$ or less, and more preferably 5 $m^2/g$ or more and 250 $m^2/g$ or less.

In still another exemplary embodiment, the planar conductive material is a high specific surface area planar conductive material, and the BET specific surface area may satisfy a range of 50 $m^2/g$ or more and 500 $m^2/g$ or less, preferably 80 $m^2/g$ or more and 300 $m^2/g$ or less, and more preferably 100 $m^2/g$ or more and 300 $m^2/g$ or less.

In yet another exemplary embodiment, the planar conductive material is a low specific surface area planar conductive material, and the BET specific surface may satisfy a range of 5 $m^2/g$ or more and 40 $m^2/g$ or less, preferably 5 $m^2/g$ or more and 30 $m^2/g$ or less, and more preferably 5 $m^2/g$ or more and 25 $m^2/g$ or less.

As other conductive materials, there may be a linear conductive material such as carbon nanotubes. The carbon nanotubes may be bundle type carbon nanotubes. The bundle type carbon nanotubes may comprise a plurality of carbon nanotube units. Specifically, the term 'bundle type' used herein, unless otherwise specified, refers to a secondary shape in the form of a bundle or rope in which the plurality of carbon nanotube units is aligned side by side or intertwined in substantially the same orientation as a longitudinal axis of the carbon nanotube unit. In the carbon nanotube unit, a graphite sheet has a cylindrical shape with a nano-sized diameter and has an sp2 bond structure. In this case, the carbon nanotube unit may exhibit characteristics of a conductor or semiconductor depending on a structure and an angle at which the graphite sheet is rolled. The bundle type carbon nanotubes may be uniformly dispersed during the preparation of a negative electrode compared to entangled type carbon nanotubes, and the conductivity of the negative electrode may be improved by smoothly forming a conductive network in the negative electrode.

In an exemplary embodiment of the present application, the linear conductive material may comprise single-walled carbon nanotubes (SWCNT); or multi-walled carbon nanotubes (MWCNT).

In an exemplary embodiment of the present application, provided is a negative electrode composition, in which the negative electrode conductive material is included in an amount of 10 parts by weight or more and 40 parts by weight or less, based on 100 parts by weight of the negative electrode composition.

In another exemplary embodiment, the negative electrode conductive material may be included in an amount of 10 parts by weight or more and 40 parts by weight or less, preferably 10 parts by weight or more and 30 parts by weight or less, and more preferably 15 parts by weight or more and 25 parts by weight or less, based on 100 parts by weight of the negative electrode composition.

In an exemplary embodiment of the present application, provided is a negative electrode composition in which the negative electrode conductive material comprises a planar conductive material; and a linear conductive material.

In an exemplary embodiment of the present application, the negative electrode conductive material comprises a planar conductive material; and a linear conductive material, and may comprise 0.01 part by weight or more and 10 parts by weight of the linear conductive material; and 90 parts by weight or more and 99.99 parts by weight or less of the planar conductive material, based on 100 parts by weight of the negative electrode conductive material.

In another exemplary embodiment, the linear conductive material may be included in an amount of 0.01 part by weight or more and 10 parts by weight or less, preferably 0.05 part by weight or more and 5 parts by weight or less, and more preferably 0.1 part by weight or more and 3 parts by weight or less, based on 100 parts by weight of the negative electrode conductive material.

In still another exemplary embodiment, the planar conductive material may be included in an amount of 90 parts by weight or more and 99.99 parts by weight or less, preferably 95 parts by weight or more and 99.95 parts by weight or less, and more preferably 97 parts by weight or more and 99.9 parts by weight or less, based on 100 parts by weight of the negative electrode conductive material.

In particular, in an exemplary embodiment of the present application, as the negative electrode conductive material comprises a planar conductive material and a linear conductive material and each satisfies the composition and ratio, the negative electrode conductive material has a feature in which output characteristics at high C-rate are excellent because the service life characteristics of the existing lithium secondary battery are not greatly affected and points where the battery can be charged and discharged are increased.

The negative electrode conductive material according to the present application has a completely different configuration from a positive electrode conductive material applied to the positive electrode. That is, the negative electrode conductive material according to the present application serves to capture a contact point between silicon-containing active materials in which the volume expansion of the electrode is very large due to charging and discharging, and the positive electrode conductive material serves to impart partial conductivity while playing a buffer role as a cushioning role when rolled, and the configuration and role thereof are completely different from those of the negative electrode conductive material of the present invention.

The negative electrode conductive material according to the present application is applied to a silicon-containing active material, and has a completely different configuration from a conductive material applied to a graphite-containing active material. That is, the conductive material used for the electrode having the graphite-containing active material simply has small particles with respect to the active material, and thus has the characteristics of enhancing the output characteristics and imparting partial conductivity, and the configuration and role thereof are completely different from those of the negative electrode conductive material applied together with the silicon-containing active material as in the present invention.

In an exemplary embodiment of the present application, the planar conductive material used as the above-described negative electrode conductive material has a structure and a role different from those of a carbon-containing active material generally used as an existing negative electrode active material. Specifically, the carbon-containing active material used as the negative electrode active material may be artificial graphite or natural graphite, and means a material that is processed into a spherical or dot shape and used in order to facilitate the storage and release of lithium ions.

In contrast, the planar conductive material used as the negative electrode conductive material is a material having a planar or plate-like shape, and may be expressed as plate-like graphite. That is, the planar conductive material is a material included to maintain the conductive path in the negative electrode active material layer, and means a material for securing a conductive path in the form of a surface in the negative electrode active material layer rather than a role of storing and releasing lithium.

That is, in the present application, the fact that plate-like graphite is used as a conductive material means that the plate-like graphite is processed into a planar or plate-like shape and used as a material that secures a conductive path rather than a role of storing or releasing lithium. In this case, the negative electrode active material included together has high capacity characteristics for lithium storage and release, and plays a role capable of storing and releasing all lithium ions transmitted from the positive electrode.

In contrast, in the present application, the fact that a carbon-containing active material is used as an active material means that the carbon-containing active material is processed into a dot or spherical shape and used as a material that serves to store or release lithium.

That is, in an exemplary embodiment of the present application, artificial graphite or natural graphite, which is a carbon-containing active material is in a dot form, and the BET specific surface area thereof may satisfy a range of 0.1 $m^2/g$ or more and 4.5 $m^2/g$ or less. In addition, plate-like graphite, which is a planar conductive material, is in a planar form, and may have a BET specific surface area of 5 $m^2/g$ or more.

In an exemplary embodiment of the present application, the negative electrode binder of the negative electrode composition may comprise at least one selected from the group consisting of a polyvinylidene fluoride-hexafluoropropylene copolymer (PVDF-co-HFP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, polyacrylic acid, an ethylene-propylene-diene monomer (EPDM), a sulfonated EPDM, styrene butadiene rubber (SBR), fluorine rubber, polyacrylic acid and a material in which the hydrogen thereof is substituted with Li, Na, Ca, or the like, and may also comprise various polymers thereof.

The negative electrode binder according to an exemplary embodiment of the present application plays a role of supporting the active material and the conductive material in order to prevent the distortion and structural deformation of the negative electrode structure in the volume expansion and relaxation of the silicon-containing active material, and when the above role is satisfied, all general binders can be applied, specifically, a water-based binder can be used, and more specifically, a polyacrylamide (PAM)-based binder can be used.

In an exemplary embodiment of the present application, the negative electrode binder may be included in an amount of 30 parts by weight or less, preferably 25 or less, and more preferably 20 parts by weight or less, and may be included in an amount of 5 parts by weight or more and 10 parts by weight or more, based on 100 parts by weight of the negative electrode composition.

In an exemplary embodiment of the present application, provided is a method for preparing a negative electrode composition, the method comprising: forming a mixture by mixing a negative electrode conductive material; and a negative electrode binder; performing a first mixing by adding water to the mixture; and performing a second mixing by adding a silicon-containing active material to the mixed mixture, in which the silicon-containing active material comprises silicon-containing particles having a particle size distribution of 0.01 μm or more and 30 μm or less and comprises 1 part by weight or more and 5 parts by weight or less of the silicon-containing particles having a particle size of 1 μm or less based on 100 parts by weight of the silicon-containing active material, and the silicon-containing active material satisfies a particle size ratio of the following Equations 1 and 2:

$$20 \le (X1/Y) \times 100(\%) \qquad \text{[Equation 1]}$$

$$(X2/Y) \times 100(\%) \le 230 \qquad \text{[Equation 2]}$$

In Equations 1 and 2,

X1 denotes the D5 particle size of the silicon-containing active material,

X2 denotes the D95 particle size of the silicon-containing active material, and

Y denotes the median particle size (D50) of the silicon-containing active material.

In another exemplary embodiment, provided is a method for preparing a negative electrode composition, the method comprising: forming a mixture by mixing a negative electrode conductive material; and a negative electrode binder; performing a first mixing by adding water to the mixture; and performing a second mixing by adding a silicon-containing active material to the mixed mixture, in which the silicon-containing active material comprises silicon-containing particles having a particle size distribution of 0.01 μm or more and 30 μm or less and comprises 1 part by weight or more and 5 parts by weight or less of the Si particles having a particle size of 1 μm or less based on 100 parts by weight of the silicon-containing active material, the D5/D50 ratio of the silicon-containing active material is 20% or more, and the D95/D50 ratio of the silicon-containing active material is 230% or less.

In the method for preparing the negative electrode composition, each composition contained in the negative electrode composition may be the same as described above.

In an exemplary embodiment of the present application, provided is a method for preparing a negative electrode in which in the first mixing and second mixing steps, mixing is performed at 2,000 rpm to 3,000 rpm for 10 minutes to 60 minutes.

In an exemplary embodiment of the present application, provided is a negative electrode for a lithium secondary battery, comprising: a negative electrode current collector layer; and a negative electrode active material layer comprising the negative electrode composition according to the present application formed on one surface or both surfaces of the negative electrode current collector layer.

FIG. 1A is a view illustrating the stacking structure of a negative electrode for a lithium secondary battery according to an exemplary embodiment of the present application. Specifically, it is possible to confirm a negative electrode 100 for a lithium secondary battery, comprising a negative electrode active material layer 20 on one surface of a negative electrode current collector layer 10, and FIG. 1A illustrates the negative electrode active material layer formed on one surface. In another embodiment, the negative electrode active material layer may be included on both surfaces of the negative electrode current collector layer. For instance, the negative electrode 100 is such that the negative electrode active material layer 20 is formed on both surfaces of the negative electrode current collector 10, as shown in FIG. 1B. Preferably, the negative electrode active material layer 20 is formed on both surfaces of the anode current collector 10.

As discussed above, there are two embodiments, one where the negative electrode active material layer is coated on one side of the negative electrode current collector (as shown in FIG. 1A), and another where the negative electrode active material layer is coated on both sides of the negative electrode current collector layer (as shown in FIG. 1B). The composition of the negative electrode active material layer to be coated on both sides may be the same or different from each other. In one embodiment, if the composition of the negative electrode active material layer is different on each side, a commonly used negative electrode active material layer such as carbon-containing or silicon-containing may be used on one side and the negative electrode active material layer disclosed herein on the other.

In an exemplary embodiment of the present application, the negative electrode for a lithium secondary battery may be formed by applying a negative electrode slurry comprising the negative electrode composition onto one surface or both surfaces of the negative electrode current collector layer and drying the negative electrode slurry.

In this case, the negative electrode slurry may comprise: the above-described negative electrode composition; and a slurry solvent.

In an exemplary embodiment of the present application, a solid content of the negative electrode slurry may satisfy 5 wt % or more and 40 wt % or less.

In another exemplary embodiment, the solid content of the negative electrode slurry may satisfy a range of 5 wt % or more and 40 wt % or less, preferably 7 wt % or more and 35 wt % or less, and more preferably 10 wt % or more and 30 wt % or less.

The solid content of the negative electrode slurry may mean the content of the negative electrode composition contained in the negative electrode slurry, and may mean the content of the negative electrode composition based on 100 parts by weight of the negative electrode slurry.

When the solid content of the negative electrode slurry satisfies the above range of 5 wt % or more and 40 wt % or less, the present invention has a feature capable of efficiently forming a negative electrode active material layer by minimizing the particle aggregation phenomenon of the negative electrode composition because the viscosity is suitable during the formation of the negative electrode active material layer.

In an exemplary embodiment of the present application, the slurry solvent can be used without limitation as long as the slurry solvent can dissolve a negative electrode composition, and specifically, water or NMP may be used.

In an exemplary embodiment of the present application, the negative electrode current collector layer generally has a thickness of 1 μm to 100 μm. The negative electrode current collector layer is not particularly limited as long as the negative electrode current collector layer has high conductivity without causing a chemical change to the battery, and for example, it is possible to use copper, stainless steel, aluminum, nickel, titanium, fired carbon, a material in which the surface of copper or stainless steel is surface-treated with carbon, nickel, titanium, silver, and the like, an aluminum-cadmium alloy, and the like. In addition, the negative electrode current collector layer may also increase the bonding strength of a negative electrode active material by forming fine convex and concave irregularities on the surface thereof, and the negative electrode current collector layer may be used in various forms such as a film, a sheet, a foil, a net, a porous body, a foaming body, and a nonwoven body.

In an exemplary embodiment of the present application, provided is a negative electrode for a lithium secondary battery, in which the negative electrode current collector layer has a thickness of 1 μm or more and 100 μm or less, and the negative electrode active material layer has a thickness of 20 μm or more and 500 μm or less.

However, the thickness may be variously modified depending on the type and use of the negative electrode used, and is not limited thereto.

In an exemplary embodiment of the present application, the porosity of the negative electrode active material layer may satisfy a range of 10% or more and 60% or less.

In another exemplary embodiment, the porosity of the negative electrode active material layer may satisfy a range of 10% or more and 60% or less, preferably 20% or more and 50% or less, and more preferably 30% or more and 45% or less.

The porosity varies depending on the composition and content of the silicon-containing active material; the conductive material; and the binder, which are included in the negative electrode active material layer, and in particular, as the silicon-containing active material; and the conductive material according to the present application are included in a specific composition and content, the above range is satisfied, and accordingly, it is characterized in that electrical conductivity and resistance in the electrode have appropriate ranges.

In an exemplary embodiment of the present application, provided is a lithium secondary battery comprising: a positive electrode; the negative electrode for a lithium secondary battery according to the present application; a separator provided between the positive electrode and the negative electrode; and an electrolyte.

FIG. 2 is a view illustrating the stacking structure of a lithium secondary battery according to an exemplary embodiment of the present application. Specifically, it is possible to confirm a negative electrode 100 for a lithium secondary battery, which comprises a negative electrode active material layer 20 on one surface (optionally both surfaces) of a negative electrode current collector layer 10 and to confirm a positive electrode 200 for a lithium secondary battery, which comprises a positive electrode active material layer 40 on one surface (optionally both surfaces) of a positive electrode current collector layer 50, and it is shown that the negative electrode 100 for a lithium secondary battery and the positive electrode 200 for a lithium secondary battery are formed in a structure in which the electrodes are stacked with a separator 30 interposed therebetween.

The secondary battery according to an exemplary embodiment of the present specification may particularly comprise the above-described negative electrode for a lithium secondary battery. Specifically, the secondary battery may comprise a negative electrode, a positive electrode, a separator interposed between the positive electrode and the negative electrode, and an electrolyte, and the negative electrode is the same as the above-described negative electrode. Since the negative electrode has been described in detail, a specific description thereof will be omitted.

The positive electrode may comprise a positive electrode current collector and a positive electrode active material layer formed on the positive electrode current collector and comprising the positive electrode active material.

In the positive electrode, the positive electrode current collector is not particularly limited as long as the positive electrode current collector has conductivity without causing a chemical change to the battery, and for example, it is possible to use stainless steel, aluminum, nickel, titanium, fired carbon, or a material in which the surface of aluminum or stainless steel is surface-treated with carbon, nickel, titanium, silver, and the like. Further, the positive electrode current collector may typically have a thickness of 3 μm to 500 μm, and the adhesion of the positive electrode active material may also be enhanced by forming fine convex and concave irregularities on the surface of the current collector. For example, the positive electrode current collector may be used in various forms such as a film, a sheet, a foil, a net, a porous body, a foam, and a non-woven fabric body.

The positive electrode active material may be a typically used positive electrode active material. Specifically, the positive electrode active material comprises: a layered compound such as lithium cobalt oxide ($LiCoO_2$) and lithium nickel oxide ($LiNiO_2$) or a compound substituted with one or more transition metals; a lithium iron oxide such as $LiFe_3O_4$; a lithium manganese oxide such as Chemical Formula $Li_{1+c1}Mn_{2-c1}O_4$ ($0 \leq c1 \leq 0.33$), $LiMnO_3$, $LiMn_2O_3$, and $LiMnO_2$; a lithium copper oxide ($Li_2CuO_2$); a vanadium oxide such as $LiV_3O_8$, $V_2O_5$, and $Cu_2V_2O_7$; a Ni site type lithium nickel oxide expressed as chemical formula $LiNi_{1-c2}M_{c2}O_2$ (here, M is at least any one selected from the group consisting of Co, Mn, Al, Cu, Fe, Mg, B and Ga, and c2 satisfies $0.01 \leq c2 \leq 0.3$); a lithium manganese composite oxide expressed as chemical formula $LiMn_{2-c3}M_{c3}O_2$ (here, M is at least any one selected from the group consisting of Co, Ni, Fe, Cr, Zn and Ta, and c3 satisfies $0.01 \leq c3 \leq 0.1$) or $Li_2Mn_3MO_8$ (here, M is at least any one selected from the group consisting of Fe, Co, Ni, Cu and Zn); $LiMn_2O_4$ in which Li of the chemical formula is partially substituted with an alkaline earth metal ion, and the like, but is not limited thereto. The positive electrode may be Li-metal.

The positive electrode active material layer may comprise a positive electrode conductive material and a positive electrode binder together with the above-described positive electrode active material.

In this case, the positive electrode conductive material is used to impart conductivity to the electrode, and can be used without particular limitation as long as the positive electrode conductive material has electron conductivity without causing a chemical change in a battery to be constituted. Specific examples thereof comprise graphite such as natural graphite or artificial graphite; a carbon-containing material such as carbon black, acetylene black, Ketjen black, channel black, furnace black, lamp black, thermal black, and carbon fiber; metal powder or metal fiber such as copper, nickel, aluminum, and silver; a conductive whisker such as zinc oxide and potassium titanate; a conductive metal oxide such as titanium oxide; or a conductive polymer such as a polyphenylene derivative, and any one thereof or a mixture of two or more thereof may be used.

The positive electrode binder serves to improve the bonding between positive electrode active material particles and the adhesion between the positive electrode active material and the positive electrode current collector. Specific examples thereof may comprise polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used.

The separator separates the negative electrode and the positive electrode and provides a passage for movement of lithium ions, and can be used without particular limitation as long as the separator is typically used as a separator in a secondary battery, and in particular, a separator having an excellent ability to retain moisture of an electrolyte as well as low resistance to ion movement in the electrolyte is preferable. Specifically, it is possible to use a porous polymer film, for example, a porous polymer film formed of a polyolefin-based polymer such as an ethylene homopolymer, a propylene homopolymer, an ethylene/butene copolymer, an ethylene/hexene copolymer, and an ethylene/methacrylate copolymer, or a laminated structure of two or more layers thereof. In addition, a typical porous non-woven fabric, for example, a non-woven fabric made of a glass fiber having a high melting point, a polyethylene terephthalate fiber, and the like may also be used. Furthermore, a coated separator comprising a ceramic component or a polymeric material may be used to secure heat resistance or mechanical strength and may be selectively used as a single-layered or multi-layered structure.

Examples of the electrolyte comprise an organic liquid electrolyte, an inorganic liquid electrolyte, a solid polymer electrolyte, a gel-type polymer electrolyte, a solid inorganic electrolyte, a molten-type inorganic electrolyte, and the like, which can be used in the preparation of a lithium secondary battery, but are not limited thereto.

Specifically, the electrolyte may comprise a non-aqueous organic solvent and a lithium salt.

As the non-aqueous organic solvent, it is possible to use, for example, a non-quantum organic solvent, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydrofuran, 2-methyl tetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate.

In particular, among the carbonate-based organic solvents, cyclic carbonates ethylene carbonate and propylene carbonate may be preferably used because the cyclic carbonates have high permittivity as organic solvents of a high viscosity and thus dissociate a lithium salt well, and such a cyclic carbonate may be more preferably used since the cyclic carbonate may be mixed with a linear carbonate of a low viscosity and low permittivity such as dimethyl carbonate and diethyl carbonate in an appropriate ratio and used to prepare an electrolyte having a high electric conductivity.

As the metal salt, a lithium salt may be used, the lithium salt is a material which is easily dissolved in the non-aqueous electrolyte, and for example, as an anion of the lithium salt, it is possible to use one or more selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

In the electrolyte, for the purpose of improving the service life characteristics of a battery, suppressing the decrease in battery capacity, and improving the discharge capacity of the battery, one or more additives, such as, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride may be further included in addition to the above electrolyte constituent components.

An exemplary embodiment of the present invention provides a battery module comprising the secondary battery as a unit cell, and a battery pack comprising the same. The battery module and the battery pack comprise the secondary battery which has high capacity, high rate properties, and cycle properties, and thus, may be used as a power source of a medium-and-large sized device selected from the group consisting of an electric car, a hybrid electric vehicle, a plug-in hybrid electric vehicle, and a power storage system.

Hereinafter, preferred embodiments will be suggested to facilitate understanding of the present invention, but the embodiments are only provided to illustrate the present invention, and it is apparent to those skilled in the art that various alterations and modifications are possible within the scope and technical spirit of the present invention, and it is natural that such alterations and modifications also fall within the accompanying claims.

PREPARATION EXAMPLES

Preparation of Negative Electrodes of Examples
1-3 and Comparative Examples 1 to 3

Preparation of Negative Electrode

A negative electrode slurry was prepared by adding a silicon-containing active material satisfying the particle size and weight ratio in the following Table 1, a first conductive material, a second conductive material, and polyacrylamide as a binder at a weight ratio of 80:9.6:0.4:10 to distilled water as a solvent for forming a negative electrode slurry (solid concentration of 25 wt %).

Specifically, the first conductive material was plate-like graphite (specific surface area: 17 m²/g, average particle diameter (D50):3.5 μm), and the second conductive material was SWCNT.

After the first conductive material, the second conductive material, the binder and water were dispersed at 2500 rpm for 30 minutes using a homo mixer as a specific mixing method, the silicon-containing active material was added thereto, and then the resulting mixture was dispersed at 2500 rpm for 30 minutes to prepare a negative electrode slurry.

Both surfaces of a copper current collector (thickness: 8 μm) as a negative electrode current collector were coated with the negative electrode slurry in a loading amount of 85 mg/25 cm², and the copper current collector was roll-pressed and dried in a vacuum oven at 130° C. for 10 hours to form a negative electrode active material layer (thickness of both layers: 33 μm), which was employed as a negative electrode (thickness of the negative electrode: 41 μm, the porosity of the negative electrode 40.0%).

Example 5

A negative electrode was prepared in the same manner as in Example 1, except that a negative electrode slurry was prepared by adding a silicon-containing active material, a first conductive material, and polyacrylamide as a binder at a weight ratio of: 80:10:10 to distilled water as a solvent for forming a negative electrode slurry in Example 1.

In the case, the first conductive material in Example 5 was carbon black (specific surface area: 58 m²/g, diameter: 37 nm).

EXPERIMENTAL EXAMPLES

Experimental Example 1: Evaluation of Service Life of Monocell

A positive electrode slurry was prepared by adding LiNi$_{0.6}$Co$_{0.2}$Mn$_{0.2}$O$_2$ (average particle diameter (D50):15

TABLE 1

| | Dmin (μm) | D5 (μm) | D50 (μm) | D95 (μm) | Dmax (μm) | Equation 1 (%) | Equation 2 (%) | Equation 3 (%) | Proportion of silicon-containing particles having particle size of 1 μm or less |
|---|---|---|---|---|---|---|---|---|---|
| Example 1 | 0.89 | 2.565 | 5.02 | 9.9 | 22 | 51.1 | 197.2 | 25.91 | 1.3 parts by weight |
| Example 2 | 0.92 | 2.74 | 6.88 | 13.7 | 26.16 | 39.8 | 199.1 | 20.00 | 1.7 parts by weight |
| Example 3 | 0.90 | 2.62 | 5.13 | 10.1 | 25.42 | 51.1 | 196.9 | 25.9 | 4 parts by weight |
| Comparative Example 1 | 0.375 | 1.027 | 5.15 | 11.81 | 26.16 | 19.9 | 229.3 | 8.70 | 6 parts by weight |
| Comparative Example 2 | 0.355 | 1.227 | 5.25 | 13.2 | 27.08 | 23.4 | 251.4 | 9.2 | 2 parts by weight |
| Comparative Example 3 | 0.385 | 1.027 | 5.15 | 12.1 | 26.05 | 19.9 | 236.3 | 8.4 | 6 parts by weight |

In Table 1, Equation 1 can be calculated as (D5/D50)×100(%), Equation 2 can be calculated as (D95/D50)×100 (%), and Equation 3 can be calculated as (D5/D95)×100(%). Further, in Table 1, the proportion of the silicon-containing particles having a particle size of 1 μm or less may indicate a weight ratio based on 100 parts by weight of the silicon-containing active material.

Example 4

A negative electrode was prepared in the same manner as in Example 1, except that a negative electrode slurry was prepared by adding the silicon-containing active material, a first conductive material, a second conductive material, a third conductive material, and polyacrylamide as the binder at a weight ratio of 80:5:4.6:0.4:10 to distilled water as a solvent for forming a negative electrode slurry in Example 1.

In this case, the first conductive material of Example 4 was carbon black C (specific surface area: 58 m²/g, diameter: 37 nm), the second conductive material of Example 4 was plate-like graphite (specific surface area: 17 m²/g, average particle diameter (D50): 3.5 μm), and the third conductive material of Example 4 was SWCNT.

μm) as a positive electrode active material, carbon black (product name: Super C65, manufacturer: Timcal) as a conductive material, and polyvinylidene fluoride (PVdF) as a binder at a weight ratio of 97:1.5:1.5 to N-methyl pyrrolidone (NMP) as a solvent for forming a positive electrode slurry (solid concentration of 78 wt %).

Both surfaces of an aluminum current collector (thickness: 12 μm) as a positive electrode current collector were coated with the positive electrode slurry in a loading amount of 537 mg/25 cm², and the aluminum current collector was roll-pressed and dried in a vacuum oven at 130° C. for 10 hours to form a positive electrode active material layer (thickness of both layers: 65 μm), thereby preparing a positive electrode (thickness of the positive electrode: 77 μm, porosity of 26%).

The secondary battery of Example 1 was prepared by interposing a polyethylene separator between the positive electrode and the negative electrode of each of Examples 1 to 5 and Comparative Examples 1 to 3 and injecting an electrolyte thereinto.

The electrolyte was obtained by adding 3 wt % of vinylene carbonate based on the total weight of the electrolyte to an organic solvent in which fluoroethylene carbonate (FEC) and diethyl carbonate (DEC) were mixed at a volume ratio of 30:70 and adding LiPF$_6$ as a lithium salt at a concentration of 1 M thereto.

The service lives and capacity retention rates of the secondary batteries prepared in Examples 1 to 5 and Comparative Examples 1 to 3 were evaluated using an electrochemical charging and discharging device. The secondary batteries were 1) charged (0.33 C CC/CV charging 4.2V 0.05 C cut) and discharged (0.33 C CC discharging 3.0V cut), and were charged and discharged by employing the aforementioned charging and discharging as a first cycle and confirming a cycle in which the capacity retention rate became 80% from a second cycle under 2) charging (1.0 C CC/CV charging 4.2V 0.05 C cut) and discharging (0.5 C CC discharging 3.0V cut) conditions.

The capacity retention rate in the Nth cycle was evaluated by the following equation. The results are shown in the following Table 2.

Capacity retention rate(%)={(Discharge capacity in
the Nth cycle)/(Discharge capacity in the 1st
cycle)}×100

Experimental Example 2: Evaluation of 2.5 C Discharge Resistance Increase Rate @SOC50 (after 300 Cycle)

After the capacity retention rate up to 300 cycles was measured during the test in Experimental Example 1, the resistance increase rates were compared and analyzed by discharging the battery with a pulse of 2.5 C at SOC50 to measure the resistance, and the results are shown in the following Table 2.

Comparative Example 1 corresponds to a case where the range of Equation 1 is not satisfied, Comparative Example 2 corresponds to a case where Equation 2 is not satisfied, and Comparative Example 3 corresponds to a case where both Equations 1 and 2 are not satisfied. In this case, a pure silicon active material in which micronization of silicon-containing particles is not controlled is included compared to Examples 1 to 5, and it could be confirmed that the service life and discharge resistance increase rate were not good because a side reaction during the charging/discharging process occurred. That is, Comparative Examples 1 to 3 comprise fine silicon particles, and it could be confirmed that Comparative Examples 1 to 3 had a structure that is disadvantageous in terms of tortuosity in the electrode, and further, it could be confirmed that the service life and resistance increase rate were not good because the rate at which the diffusion resistance increased caused by the formation of an SEI layer due to a reaction between fine silicon particles and lithium ions was increased according to the repetition of charging and discharging.

For reference, Examples 1 to 3 correspond to the case where a planar conductive material and a linear conductive material are used as the conductive material (two conductive materials) In this case, it could be confirmed that compared to Example 4 (three conductive materials) and Example 5 (one conductive material), the results of evaluating the service life were particularly excellent and the discharge resistance increase rate was also low. This is because a negative electrode for a lithium secondary battery in which

TABLE 2

| | Example 1 | Example 2 | Example 3 | Example 4 | Example 5 | Comparative Example 1 | Comparative Example 2 | Comparative Example 3 |
|---|---|---|---|---|---|---|---|---|
| Evaluation of service life (times @SoH80 %) | 275 | 274 | 273 | 270 | 265 | 250 | 255 | 241 |
| Discharge resistance increase rate (%) | 97 | 101 | 115 | 140 | 153 | 220 | 214 | 226 |

As can be confirmed in Tables 1 and 2, it could be confirmed that the negative electrode for a lithium secondary battery, in which the silicon-containing active material according to the present application was used, was better in service life evaluation and discharge resistance increase rate than those in Comparative Examples 1 to 3. This is a result of satisfying the ranges of at least Equations 1 and 2 according to the present application using a silicon-containing active material having silicon-containing particles whose micronization is controlled.

That is, it was confirmed that as the silicon-containing active materials according to Examples 1 to 5 satisfied the characteristic parts according to the present application, fine silicon-containing particles could be removed to form a structure which is advantageous in terms of tortuosity in the electrode, thereby preventing the diffusion resistance from increasing. In addition, even though the cycle of the charging and discharging process is continued, the rate at which the diffusion resistance increases can be greatly controlled by removing fine silicon particles, so that it could be confirmed from Examples 1 to 5 that the service life and capacity of the electrode comprising the silicon-containing active material were significantly increased.

the two conductive materials are included does not significantly affect the service life characteristics of an existing lithium secondary battery, has many points where the battery can be charged and discharged due to an increase in conductive path, and thus has excellent output characteristics at high C-rate.

Experimental Example 3: Evaluation of R_ion Resistance (Measurement of Pore Resistance Using Coin Half Cell)

[Preparation of Symmetric Cell]

The negative electrodes prepared in Example 1 and Comparative Example 1 were punched out with a 15-pie punching machine, and a coin cell was assembled using two electrodes having similar thicknesses and weights (negative electrode/separator/negative electrode and electrolyte were the same). After the coin cell was sufficiently impregnated with an electrolytic solution, the pore resistance of the electrode was measured by measuring EIS at room temperature from 300 kHz to 100 mHz at 100 points and an amplitude of 5 mV, and the results are shown in the following Table 3.

TABLE 3

| | Example 1 | Comparative Example 1 |
|---|---|---|
| Ohm (Ω) | 4.39 | 7.65 |

As can be confirmed in Table 3, it could be confirmed through the measurement of the resistance that when the silicon-containing active material according to the present application satisfied the ranges of specific Equations 1 and 2, a structure that is advantageous in terms of tortuosity in the electrode was formed. Specifically, $R_{ion}$ needs to be low in order to prevent heterogeneous degeneration as it enters from the surface part of the negative electrode to the inside of the negative electrode and improve the performance of the cell, and it could be confirmed that the lowering of the $R_{ion}$ was improved using a silicon-containing active material which was controlled to the specific conditions according to the present application.

That is, a negative electrode having the silicon-containing active material according to the present application has a structure that is advantageous in terms of tortuosity, and it could be confirmed that the cell diffusion resistance could be improved by improving the conductive path, and the service life durability of the resulting lithium secondary battery was enhanced.

REFERENCE NUMERALS

10: negative electrode current collector layer
20: negative electrode active material layer
30: separator
40: positive electrode active material layer
50: positive electrode current collector layer
100: negative electrode for a lithium secondary battery
200: positive electrode for a lithium secondary battery

What is claimed is:

1. A negative electrode composition comprising:
a silicon-containing active material;
a negative electrode conductive material; and
a negative electrode binder,
wherein the silicon-containing active material comprises silicon-containing particles having a particle size distribution of 0.01 μm or more and 30 μm or less,
the silicon-containing active material comprises 1 part by weight or more and 5 parts by weight or less of the silicon-containing particles having a particle size of 1 μm or less based on 100 parts by weight of the silicon-containing active material, and
the silicon-containing active material satisfies a particle size ratio of the following Equations 1, 2 and 3:

$$20 \leq (X1/Y) \times 100(\%) \qquad \text{[Equation 1]}$$

$$(X2/Y) \times 100(\%) \leq 230 \qquad \text{[Equation 2]}$$

$$10 \leq (X1/X2) \times 100(\%) \qquad \text{[Equation 3]}$$

in Equations 1, 2 and 3,
X1 denotes a D5 particle size of the silicon-containing active material,
X2 denotes a D95 particle size of the silicon-containing active material, and
Y denotes a median particle size (D50) of the silicon-containing active material.

2. The negative electrode composition of claim 1, wherein the silicon-containing particles comprise one or more selected from the group consisting of SiOx, wherein x=0, SiOx, wherein 0<x<2, SiC, and a Si alloy.

3. The negative electrode composition of claim 1, wherein the silicon-containing particles comprise one or more selected from the group consisting of SiOx, wherein x=0 and SiOx, wherein 0<x<2, and comprise 70 parts by weight or more of the SiOx, wherein x=) based on 100 parts by weight of the silicon-containing active material.

4. The negative electrode composition of claim 1, wherein the silicon-containing active material is present in an amount of 60 parts by weight or more based on 100 parts by weight of the negative electrode composition.

5. The negative electrode composition of claim 1, wherein the silicon-containing particles having a particle size distribution of 0.01 μm or more and 30 μm or less have a full width at half maximum of 1 μm or more and 5 μm or less.

6. The negative electrode composition of claim 1, wherein the negative electrode conductive material comprises a planar conductive material and a linear conductive material.

7. A method for preparing a negative electrode composition, the method comprising:
mixing a negative electrode conductive material and a negative electrode binder to form a mixture;
performing a first mixing by adding water to the mixture; and
performing a second mixing by adding a silicon-containing active material to the first mixed mixture,
wherein the silicon-containing active material comprises silicon-containing particles having a particle size distribution of 0.01 μm or more and 30 μm or less,
the silicon-containing active material comprises 1 part by weight or more and 5 parts by weight or less of the silicon-containing particles having a particle size of 1 μm or less based on 100 parts by weight of the silicon-containing active material, and
the silicon-containing active material satisfies particle size ratios of the following Equations 1 and 2:

$$20 \leq (X1/Y) \times 100(\%) \qquad \text{[Equation 1]}$$

$$(X2/Y) \times 100(\%) \leq 230 \qquad \text{[Equation 2]}$$

in Equations 1 and 2,
X1 denotes a D5 particle size of the silicon-containing active material,
X2 denotes a D95 particle size of the silicon-containing active material, and
Y denotes a median particle size (D50) of the silicon-containing active material.

8. The method of claim 7, wherein in the first mixing and second mixing steps, mixing is performed at 2,000 rpm to 3,000 rpm for 10 minutes to 60 minutes.

9. A negative electrode for a lithium secondary battery, comprising:
a negative electrode current collector layer; and
a negative electrode active material layer comprising the negative electrode composition according to claim 1 on one surface or both surfaces of the negative electrode current collector layer.

10. The negative electrode of claim 9, wherein the negative electrode current collector layer has a thickness of 1 μm or more and 100 μm or less, and
the negative electrode active material layer has a thickness of 20 μm or more and 500 μm or less.

11. A lithium secondary battery comprising:
a positive electrode;
the negative electrode for a lithium secondary battery according to claim 9;

a separator between the positive electrode and the negative electrode; and an electrolyte.

12. A negative electrode composition comprising:

a silicon-containing active material;

a negative electrode conductive material; and a negative electrode binder, wherein the silicon-containing active material comprises silicon-containing particles having a particle size distribution of 0.01 µm or more and 30 µm or less have a full width at half maximum of 1 µm or more and 5 µm or less, the silicon-containing active material comprises 1 part by weight or more and 5 parts by weight or less of the silicon-containing particles having a particle size of 1 µm or less based on 100 parts by weight of the silicon-containing active material, and the silicon-containing active material satisfies a particle size ratio of the following Equations 1 and 2:

$$20 \leq (X1/Y) \times 100(\%) \qquad \text{[Equation 1]}$$

$$(X2/Y) \times 100(\%) \leq 230 \qquad \text{[Equation 2]}$$

in Equations 1 and 2,

X1 denotes a D5 particle size of the silicon-containing active material,

X2 denotes a D95 particle size of the silicon-containing active material, and

Y denotes a median particle size (D50) of the silicon-containing active material.

13. A negative electrode composition comprising:

a silicon-containing active material;

a negative electrode conductive material; and a negative electrode binder, wherein the silicon-containing active material comprises silicon-containing particles having a particle size distribution of 0.01 µm or more and 30 µm or less, the silicon-containing active material comprises 1.3 parts by weight or more and 4 parts by weight or less of the silicon-containing particles having a particle size of 1 µm or less based on 100 parts by weight of the silicon-containing active material, and the silicon-containing active material satisfies a particle size ratio of the following Equations 1 and 2:

$$20 \leq (X1/Y) \times 100(\%) \qquad \text{[Equation 1]}$$

$$(X2/Y) \times 100(\%) \leq 230 \qquad \text{[Equation 2]}$$

in Equations 1 and 2,

X1 denotes a D5 particle size of the silicon-containing active material,

X2 denotes a D95 particle size of the silicon-containing active material, and

Y denotes a median particle size (D50) of the silicon-containing active material.

14. A negative electrode composition comprising:

a silicon-containing active material;

a negative electrode conductive material; and a negative electrode binder, wherein the silicon-containing active material comprises silicon-containing particles having a particle size distribution of 0.01 µm or more and 30 µm or less, the silicon-containing active material comprises 1 part by weight or more and 5 parts by weight or less of the silicon-containing particles having a particle size of 1 µm or less based on 100 parts by weight of the silicon-containing active material, and the silicon-containing active material satisfies a particle size ratio of the following Equations 1 and 2:

$$20 \leq (X1/Y) \times 100(\%) \qquad \text{[Equation 1]}$$

$$(X2/Y) \times 100(\%) \leq 230 \qquad \text{[Equation 2]}$$

in Equations 1 and 2,

X1 denotes a D5 particle size of the silicon-containing active material,

X2 denotes a D95 particle size of the silicon-containing active material, and

Y denotes a median particle size (D50) of the silicon-containing active material.

15. A negative electrode composition comprising:

a silicon-containing active material;

a negative electrode conductive material; and a negative electrode binder, wherein the silicon-containing active material comprises silicon-containing particles having a particle size distribution of 0.01 µm or more and 30 µm or less, the silicon-containing active material comprises 1 part by weight or more and 5 parts by weight or less of the silicon-containing particles having a particle size of 1 µm or less based on 100 parts by weight of the silicon-containing active material, and the silicon-containing active material satisfies a particle size ratio of the following Equations 1 and 2:

$$20 \leq (X1/Y) \times 100(\%) \qquad \text{[Equation 1]}$$

$$(X2/Y) \times 100(\%) \leq 230 \qquad \text{[Equation 2]}$$

in Equations 1 and 2,

X1 denotes a D5 particle size of the silicon-containing active material,

X2 denotes a D95 particle size of the silicon-containing active material, and

Y denotes a median particle size (D50) of the silicon-containing active material.

* * * * *